US012072816B2

(12) United States Patent
Kim et al.

(10) Patent No.: US 12,072,816 B2
(45) Date of Patent: Aug. 27, 2024

(54) SYSTEM-ON-CHIP OPERATING MULTIPLE CPUS OF DIFFERENT TYPES, AND OPERATION METHOD FOR SAME

(71) Applicant: TELECHIPS INC., Seoul (KR)

(72) Inventors: Moon-Soo Kim, Seoul (KR); Yongseok Oh, Seoul (KR); Hoyeonjiki Kim, Seoul (KR); Taehun Jeong, Seoul (KR)

(73) Assignee: TELECHIPS INC., Seoul (KR)

( * ) Notice: Subject to any disclaimer, the term of this patent is extended or adjusted under 35 U.S.C. 154(b) by 43 days.

(21) Appl. No.: 17/783,175

(22) PCT Filed: Nov. 25, 2020

(86) PCT No.: PCT/KR2020/016787
§ 371 (c)(1),
(2) Date: Jun. 7, 2022

(87) PCT Pub. No.: WO2021/132904
PCT Pub. Date: Jul. 1, 2021

(65) Prior Publication Data
US 2023/0020191 A1   Jan. 19, 2023

(30) Foreign Application Priority Data
Dec. 24, 2019   (KR) ........................ 10-2019-0174323

(51) Int. Cl.
*G06F 13/16* (2006.01)
*G06F 9/44* (2018.01)
(Continued)

(52) U.S. Cl.
CPC ........ *G06F 13/1663* (2013.01); *G06F 9/4405* (2013.01); *G06F 13/1668* (2013.01); *G06F 15/7807* (2013.01)

(58) Field of Classification Search
CPC .............. G06F 13/1663; G06F 9/4405; G06F 13/1668; G06F 15/7807
See application file for complete search history.

(56) References Cited

U.S. PATENT DOCUMENTS

| 2011/0138160 A1* | 6/2011 | Sato ........................ G06F 3/061 |
| | | 711/E12.078 |
| 2013/0151829 A1* | 6/2013 | Amann ................... G06F 12/00 |
| | | 713/2 |

(Continued)

FOREIGN PATENT DOCUMENTS

| KR | 10-2009-0060774 A | 6/2009 |
| KR | 10-2009-0098798 A | 9/2009 |

(Continued)

*Primary Examiner* — Henry Tsai
*Assistant Examiner* — Harry Z Wang
(74) *Attorney, Agent, or Firm* — Dilworth & Barrese, LLP.; Michael J. Musella, Esq.

(57) ABSTRACT

A system-on-chip (SoC) for operating a plurality of different central processing units and a method for operating the same are provided. The SoC includes a plurality of central processing units (CPUs) that execute respective software programs independently of each other, a bus interconnector for connecting the plurality of CPUs, and at least one access control device that is connected to the bus interconnector and controls each access to a physical resource shared by the plurality of CPUs via the bus interconnector, for each CPU.

9 Claims, 4 Drawing Sheets

(51) Int. Cl.
    *G06F 9/4401*     (2018.01)
    *G06F 15/78*     (2006.01)

(56) References Cited

U.S. PATENT DOCUMENTS

| | | | | |
|---|---|---|---|---|
| 2013/0318310 | A1* | 11/2013 | Yamauchi | G06F 11/203 |
| | | | | 711/151 |
| 2013/0318311 | A1* | 11/2013 | Heo | G06F 1/3253 |
| | | | | 711/152 |
| 2014/0223569 | A1* | 8/2014 | Gail | G06F 21/60 |
| | | | | 726/26 |
| 2015/0074308 | A1* | 3/2015 | Ono | G06F 13/1605 |
| | | | | 710/117 |
| 2017/0199835 | A1* | 7/2017 | Kim | G06F 13/1605 |
| 2018/0052785 | A1* | 2/2018 | Suh | G06F 13/1668 |
| 2020/0159449 | A1* | 5/2020 | Davis | G06F 3/0604 |

FOREIGN PATENT DOCUMENTS

| | | |
|---|---|---|
| KR | 10-2013-0128208 A | 11/2013 |
| KR | 10-2016-0128678 A | 11/2016 |
| KR | 10-2017-0084969 A | 7/2017 |

* cited by examiner

SYSTEM-ON-CHIP OPERATING MULTIPLE CPUS OF DIFFERENT TYPES, AND OPERATION METHOD FOR SAME

CROSS-REFERENCE TO RELATED APPLICATION

This application claims priority to and the benefit of Korean Patent Application No. 10-2019-0174323 filed in the Korean Intellectual Property Office on Dec. 24, 2019, the entire contents of which are incorporated herein by reference.

BACKGROUND

(a) Field

The present invention relates to a system-on-chip for operating heterogeneous multi-CPUs and a method for operating the same.

(b) Description of the Related Art

Cases in which a plurality of central processing units (hereinafter, collectively referred to as 'CPU') is supported on a single system-on-chip (SoC) are increasing. Such systems are classified into symmetric multi-processing (SMP) in which a plurality of identical CPUs exist, and asymmetric multi-processing (AMP) consisting of a plurality of heterogeneous CPUs.

In SMP, mainly one operating system (OS) occupies all CPUs on an SoC and processes tasks by distributing the tasks to each CPU, which improves overall processing performance of general tasks.

Meanwhile, in AMP, each CPU is dedicated to processing different specific tasks. For example, a load of CPU used for general purposes can be reduced by exclusively charging a specific CPU with tasks such as graphic processing and digital signal processing.

In order that multiple heterogeneous CPUs on a single SoC are dedicated to specific tasks different from each other, each CPU should be able to independently operate an OS. As such, when multiple heterogeneous CPUs on a single SoC independently operate OSs, respectively, each OS independently operates for different purposes. Accordingly, a race condition for access to a shared physical resource may occur.

Conventionally, virtualization technology has been used in a situation where multiple OSs sharing physical resources are operated.

The virtualization technology is a technology for abstracting one physical resource into a plurality of virtual logical resources, and the software performing such a virtualization is referred to as a hypervisor. Based on a higher access authority to a physical resource than the OS, the hypervisor controls an access by an OS to a physical resource, and manages the physical resource after abstracting the same. It allows multiple OSs to access and use a single physical resource without a race condition.

However, it takes time for the hypervisor to control access to the physical resource by an OS and control the virtual logical resource, which may also cause a need for an additional allocation of a memory region for the hypervisor to operate.

Such additional time consumption may cause latency time for a task processed by multiple OSs operating on the SoC. In particular, for a task requiring real-time, such a latency time may serve as a large limitation.

SUMMARY

The present invention provides a system-on-chip (SoC) for operating heterogeneous multi-OSs executing mutually independent software programs and a method for operating the same. The heterogeneous multi-OSs are operated to share physical resources without a race condition and to block access by other CPUs to a physical resource requiring protection.

According to an embodiment of the present invention, a system-on-chip (SoC) is provided. The SoC includes a plurality of central processing units (CPUs) that execute respective software programs independently of each other, a bus interconnector for connecting the plurality of CPUs, and at least one access control device that is connected to the bus interconnector and controls each access to a physical resource shared by the plurality of CPUs via the bus interconnector, for each CPU.

The at least one access control device may perform an access control including at least one of a request for sharing a physical resource, a request for accessing a physical resource, and a communication between CPUs including transmission of state information of a CPU.

The plurality of CPUs may include at least two CPUs that share physical resources including a memory via a first bus interface, and may further include a resource sharing control device that controls an access to a physical resource exclusively used between the at least two CPUs among the shared physical resources.

The at least two CPUs may include a first CPU that executes a first software program, and a second CPU that executes a second software program different from the first software program. The resource sharing control device may physically separate a memory region onto which the first software program is loaded among physical resources exclusively used between the at least two CPUs, and block an access by the second CPU to the separated memory region.

The resource sharing control device may operate a firmware having a higher authority level than the first software program and the second software program, and control an access to the exclusively used physical resource through the firmware.

The plurality of CPUs may include a third CPU that is connected to a static random access memory (RAM) and a plurality of devices via a second bus interface, and executes a third software program. Further, at least one access control device may include a first access control device that is placed between the second bus interface and the bus interconnector, and controls accesses of other CPUs to the static RAM and the plurality of devices.

The plurality of CPUs may include a fourth CPU that is connected to a code RAM onto which program codes including a boot code are loaded and a data RAM onto which user data is loaded, via a third bus interface, and executes a fourth software program. And the at least one access control device may further include a second access control device that is placed between the third bus interface and the bus interconnector, and controls accesses of other CPUs to the code RAM and the data RAM.

The first CPU may include a quad-core, and the second CPU, the third CPU, and the fourth CPU may include a single-core.

The plurality of CPUs may execute independently respective software programs after the third CPU, the first CPU, the fourth CPU, and the second CPU are booted sequentially.

According to another embodiment of the present invention, a method for operating a plurality of central processing units (CPUs) mounted on a single system-on-chip (SoC) is provided. The method includes executing a boot code of the SoC in a first CPU, and executing a primary bootloader called by the boot code in the first CPU. The first bootloader may execute a first software program of the first CPU, and call a secondary bootloader executed in a second CPU. The secondary bootloader may call a tertiary bootloader executing a second software program of the second CPU, and execute a third software program of a third CPU. And the tertiary bootloader may execute a fourth software program of a fourth CPU.

The first software program may include an operating system (OS), the second software program may include a Linux kernel, the third software program may include a real-time operating system (RTOS), and the fourth software program may include a firmware.

The third software program may be executed by the second bootloader, when a first access control device that is connected to a bus interconnector connecting the second CPU and the third allows the second CPU to access the third CPU.

The fourth software program may be executed by the third bootloader, when a second access control device that is connected to a bus interconnector connecting the second CPU and the fourth CPU allows the second CPU to access the fourth CPU.

According to an embodiment of the present invention, in a system-on-chip (SoC) operating heterogeneous multi-CPUs, a physical resource can be shared without a race condition between each of the CPUs without using virtualization technology as in the prior art, and an access of a CPU to some shared resources may be controlled. Accordingly, an additional latency time due to using the virtualization technology is not caused. Furthermore, performance deterioration due to an overhead can be solved.

In addition, for applications requiring real-time task processing, it is possible to provide an environment in which real-time is guaranteed.

DETAILED DESCRIPTION OF THE EMBODIMENTS

Figure 1:
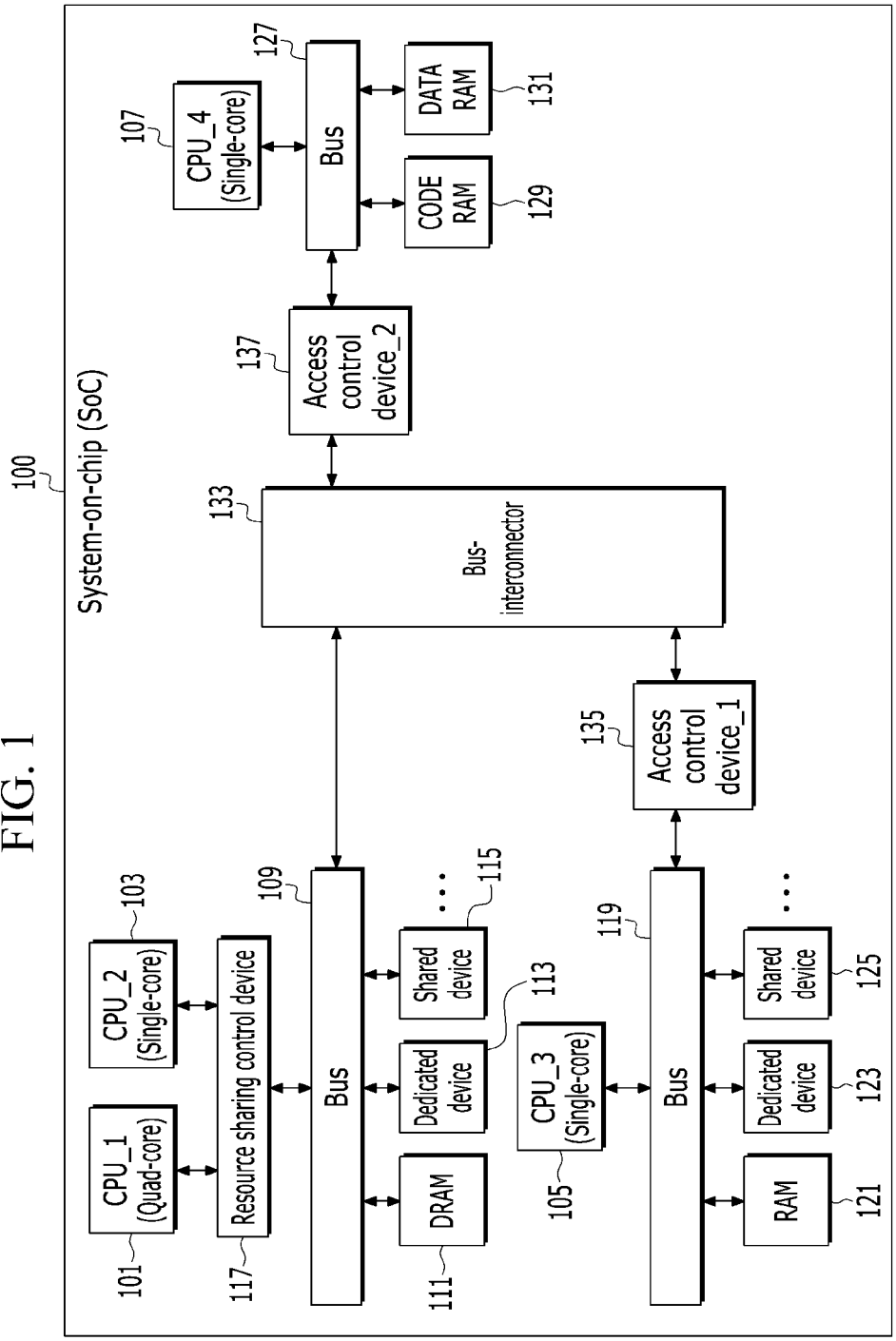
FIG. 1 is a configuration diagram of a system-on-chip (SoC) according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, when a part is referred to "include" or "comprise" a certain constituent element, it means that it may further include other constituent elements rather than exclude other elements, unless specifically indicates otherwise.

In the description, the terms such as " . . . unit", " . . . er/or", " . . . module", and the like refer to units that process at least one function or operation, which may be implemented with a hardware, a software or a combination thereof.

In the description, "transmission" or "provision" may include direct transmission or provision, as well as indirect transmission or provision through other devices or by way of bypass.

In the description, expressions described in the singular in this specification may be interpreted as the singular or plural unless an explicit expression such as "one" or "single" is used.

In this specification, the same reference numerals designate the same constituent elements throughout all the drawings, and "and/or" includes each of the constituent elements and all combinations thereof.

The ordinal numbers such as "first" and "second" are used for describing various constituent elements but does not limit the constituent elements. Further, the ordinal numbers are used only for distinguishing a constituent element from another constituent element. For example, without departing from the scope of the present disclosure, a first constituent element may be referred to as a second constituent element, and similarly, a second constituent element may also be referred to as a first constituent element.

In this specification, a "bootloader" refers to a program that reads a software program from a specific storage medium (e.g., external storage device) and install the program on a main memory unit (e.g., RAM) so that a user can use an electronic device when booting or starting the electronic device.

Figure 2:
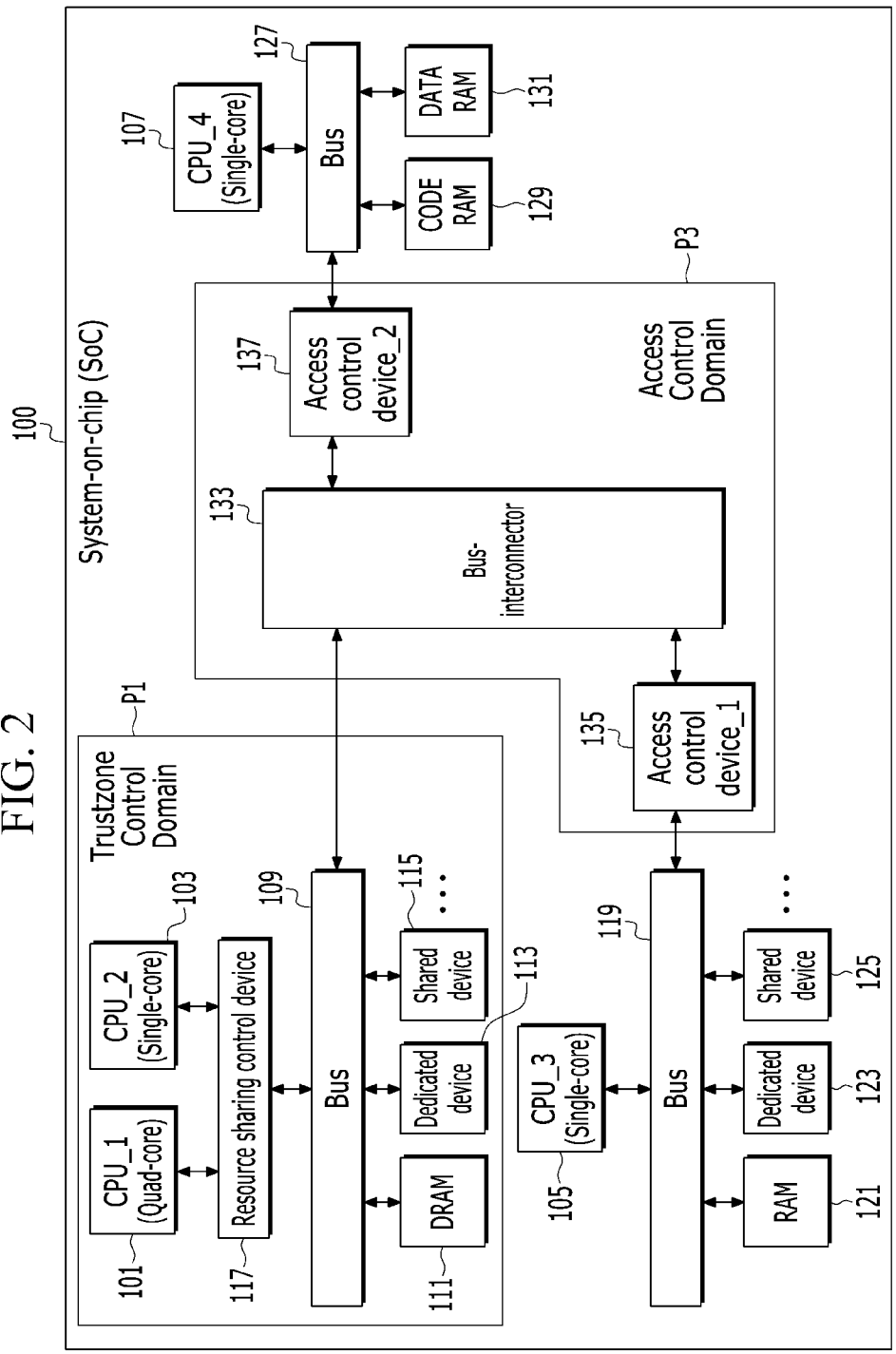
FIG. 2 is a diagram illustrating control domains of two types on the system-on-chip (SoC) shown in FIG. 1.

FIG. 1 is a configuration diagram of a system-on-chip (SoC) according to an embodiment of the present invention, and FIG. 2 is a diagram illustrating control domains of two types on the system-on-chip (SoC) shown in FIG. 1.

Referring to FIG. 1, an SoC 100 includes four central processing units (hereinafter, collectively referred to as 'CPU') 101, 103, 105, and 107.

The SoC 100 includes a CPU_1 101, a CPU_2 103, a CPU_3 105, and a CPU_4 107. At this time, the CPU_1 101, the CPU_2 103, the CPU_3 105, and the CPU_4 107 are CPUs of different types and execute respective software programs performing independent tasks.

Here, the CPU_1 101 can execute a system operating system (OS). The system OS executes general-purpose tasks including interaction with a user, and may be, for example, an Android OS.

The CPU_2 103 can execute a software program that processes a special task requiring fast processing without user interaction. For example, the CPU_2 103 may execute a Linux kernel.

The CPU_3 105 can execute a software program that processes a task requiring real-time processing. For example, the CPU_3 105 may execute a real time operating system (RTOS).

The CPU_4 107 may include a low-end processor compared to other CPUs 101, 103, and 105. The CPU_4 107 can execute a security firmware that processes encryption/decryption operations such as an integrity check.

The CPU_1 101 may include a quad-core processor. The CPU_2 103, the CPU_3 105, and the CPU_4 107 may include a single-core processor.

As such, the CPU_1 101, the CPU_2 103, the CPU_3 105, and the CPU_4 107 execute software programs independent of each other. Therefore, for example, the software program of the CPU_1 101 can use all four core processors. Specifically, when the software program of the CPU_1 101 is the system OS, the CPU_1 101 can occupy all four core processors, thereby improving a performance of the whole SoC 100.

The CPU_1 101 and CPU_2 103 are connected to a synchronous dynamic random access memory (SDRAM) 111, a dedicated device 113, and a plurality of shared devices 115 via a bus 109. Here, the dedicated device 113 and the plurality of shared devices 115 may include a universal asynchronous receiver/transmitter (UART), an inter-integrated circuit (I2C), a GPSB, an embedded multi-media card (eMMC), and the like.

At this time, a resource sharing control device 117 is placed between the CPUs (the CPU_1 101 and the CPU_2 103) and the bus 109.

The resource sharing control device 117 controls an access to an exclusively used physical resource among physical resources shared by the CPU_1 101 and the CPU_2 103.

The CPU_3 105 is connected to a static random-access memory (SRAM) 121, a dedicated device 123, and a plurality of shared devices 125 via a bus 119. Here, the dedicated device 123 and the plurality of shared devices 125 may include a UART, an input capture timer counter (ICTC), a serial flash memory, a GPSB, and the like.

At this time, UART, GPSB, and the like may be CPU-only resources that are not shared.

The CPU_4 107 is connected to a code RAM 129 and a data RAM 131 via a bus 127. The code RAM 129 and the data RAM 131 load a software program (e.g., security firmware) of the CPU_4 107. In this case, the data RAM 131 may be a dedicated physical resource that is not shared and occupied only by the CPU_4 107. Accordingly, an access to the data RAM 131 may be blocked by an access control device_2 137.

The buses 109, 119, and 127 are connected to physical resources 111, 115, 121, 125, 129, and 131 that are connected to each of the buses 109, 119, 127, through connections via a bus-interconnector 133. Accordingly, the CPU_1 101, the CPU_2 103, the CPU_3 105, and the CPU_4 107 may share the physical resources 111, 115, 121, 125, 129, and 131. For example, the CPU_1 101 may access the physical resources 121 and 125 connected to the bus 119 of CPU_3 105. Here, the data RAM 131 may be selectively shared by the access control device_2 137.

In this case, the CPU_1 101 and the CPU_2 103 share all physical resources 111, 113, and 115 other than a processor.

However, when all the physical resources 111, 115, 121, 125, 129, and 131 are shared by all the CPUs 101, 103, 105, and 107 as above described, there may occur a race condition in accesses to the physical resources 111, 115, 121, 125, 129, and 131. In order for each of all the CPUs 101, 103, 105, and 107 to share the physical resources 111, 115, 121, 125, 129, and 131 without such a race condition, the embodiment of the present invention defines two types of control domains P1 and P3.

Referring to FIG. 2, a trustzone control domain P1 is controlled by a resource sharing control device 117.

A CPU_1 (101) and a CPU_2 (103) share all physical resources 111, 113, and 115 in addition to including a memory rather than via a bus-interconnector 133. At this time, through physical division, the resource sharing control device 117 blocks an access to a physical resource that should be used exclusively among the shared physical resources.

The resource sharing control device 117 uses ARM Trustzone Technology to separate the use of physical resources. Specifically, the resource sharing control device 117 may operate a firmware having a higher authority than an OS by using the ARM Trustzone Technology.

The resource sharing control device 117 may set an exclusive access right for the only CPU_1 101 to some physical resources among the physical resources shared by the CPU_1 101 and the CPU_2 103. The resource sharing control device 117 blocks the CPU_2 103 to access the physical resource to which an exclusive access authority is set for only the CPU_1 101.

The access control domain P3 is controlled by the access control device_1 135 and the access control device_2 137 that are connected to the bus-interconnector 133.

The access control device_1 135 is connected between the bus 119 and the bus-interconnector 133.

The access control device_1 135 sets a separate access authority to the physical resources 121, 123, and 125 connected via the bus 119. This access authority may include an access blocking setting of other CPUs 101, 103, and 107 to the CPU_3 105 or the physical resources 121, 123, and 125. The access control device_1 135 may block traffic directed to the bus 119 via the bus-interconnector 133.

The access control device_2 137 is connected between the bus 127 and the bus-interconnector 133.

The access control device_2 137 sets a separate access authority to the physical resources 129 and 131 that are connected via the bus 127. This access authority may include an access blocking setting of other CPUs 101, 103, and 105 to the CPU_4 107 or the physical resources 129 and 131.

The access control device_2 137 may block traffic directed to the bus 127 via the bus-interconnector 133.

Here, the traffic blocked by the access control device_1 135 and the access control device_2 137 may include a request for sharing a physical resource, a request for accessing a physical resource, a request for communicating between CPUs, and the like.

The request for communicating between CPUs may include a request for transmitting abnormal state information of each of the CPUs 101, 103, 105, and 107. Here, the abnormal state information may include at least one of reset, restart, reboot, and crash.

As such, a physical resource connected to the CPU_3 105 or CPU_4 107 may be shared or protected by using the access control devices 135 and 137.

As described above with reference to FIG. 1 and FIG. 2, according to an embodiment of the present invention, each of the CPUs 101, 103, 105, and 107 can independently executes a software program and share a physical resource without a race condition.

At this time, a booting method for switching each of the CPUs 101, 103, 105, and 107 to an operable state will be described. A booting order includes a process of operating an operating environment between each of the CPUs 101, 103, 105, and 107 and a software program.

Four heterogeneous CPUs 101, 103, 105, and 107 on an SoC 100 operate independent software programs and perform tasks of different purposes, respectively. As described above, each of the CPUs 101, 103, 105, and 107 owns its own physical resource, and shares and uses the resource with other CPUs 101, 103, 105, and 107. Accordingly, through unifying a booting step in which an initialization of physical resources is performed, the resources are initialized without an occurrence of a race condition.

Figure 3:
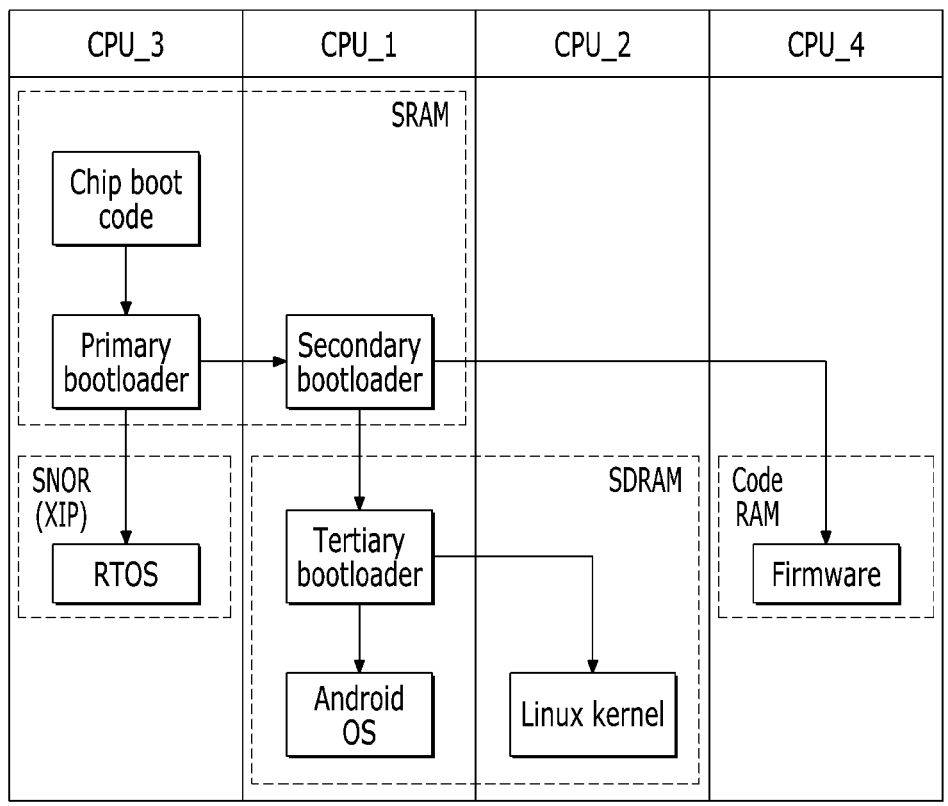
FIG. 3 is a diagram showing a booting order from a point of view of a memory according to an embodiment of the present invention.

FIG. 3 is a diagram showing a booting order from a point of view of a memory according to an embodiment of the present invention.

Referring to FIG. 3, a booting order for a resource initialization without an occurrence of a race condition is shown in terms of a memory usage.

When a power on an SoC 100 is turned on, a CPU_3 (105 in FIG. 1) loads chip boot code (Chipboot ROM Code) stored in a ROM onto a SRAM (121 in FIG. 1 and FIG. 2) and then executes the chip boot code. The chip boot code calls a primary bootloader. Then, the CPU_3 105 loads the called primary boot loader onto the SRAM (121 in FIG. 1 and FIG. 2) and executes the primary bootleader.

The primary bootloader calls a secondary bootloader of a CPU_1 (101 in FIG. 1 and FIG. 2). The CPU_1 101 loads the called secondary bootloader onto the SRAM 121 and executes the secondary bootloader. The secondary bootloader calls a tertiary bootloader.

The CPU_1 101 loads the called tertiary bootloader onto a SDRAM (111 in FIG. 1 and FIG. 2) and then executes the tertiary bootloader.

The primary bootloader calls a RTO of the CPU_3 105, and the called RTOS may be executed by applying eXecution In Place (XIP) to a serial NOR flash memory (SNOR) of the CPU_3(105). Here, the SNOR is a non-volatile memory unlike the SRAM 121 and SDRAM 111, due to physical characteristics. Since the SNOR supports byte access unlike other volatile memories, a RTOS may be directly executed on the SNOR without being loaded onto a memory such as the SDRAM 111.

The secondary bootloader calls a firmware of a CPU_4 (107 in FIG. 1 and FIG. 2), and the called firmware is loaded onto a code RAM (129 in FIG. 1 and FIG. 2) of the CPU_4 (107).

The tertiary bootloader calls Android OS of the CPU_1 101 and Linux kernel of the CPU_2 (103 of FIG. 1 and FIG. 2), and the called Android OS and Linux kernel are loaded onto the SDRAM 111.

As such, the four heterogeneous CPUs 101, 103, 105, and 107 operate in parallel at the time point of power-on. The heterogeneous CPUs 101, 103, 105, and 107 are driven successively in an order of CPU_3 105→CPU_1 101→CPU_2 103→CPU_4 107, and then independently execute respective software programs.

Figure 4:
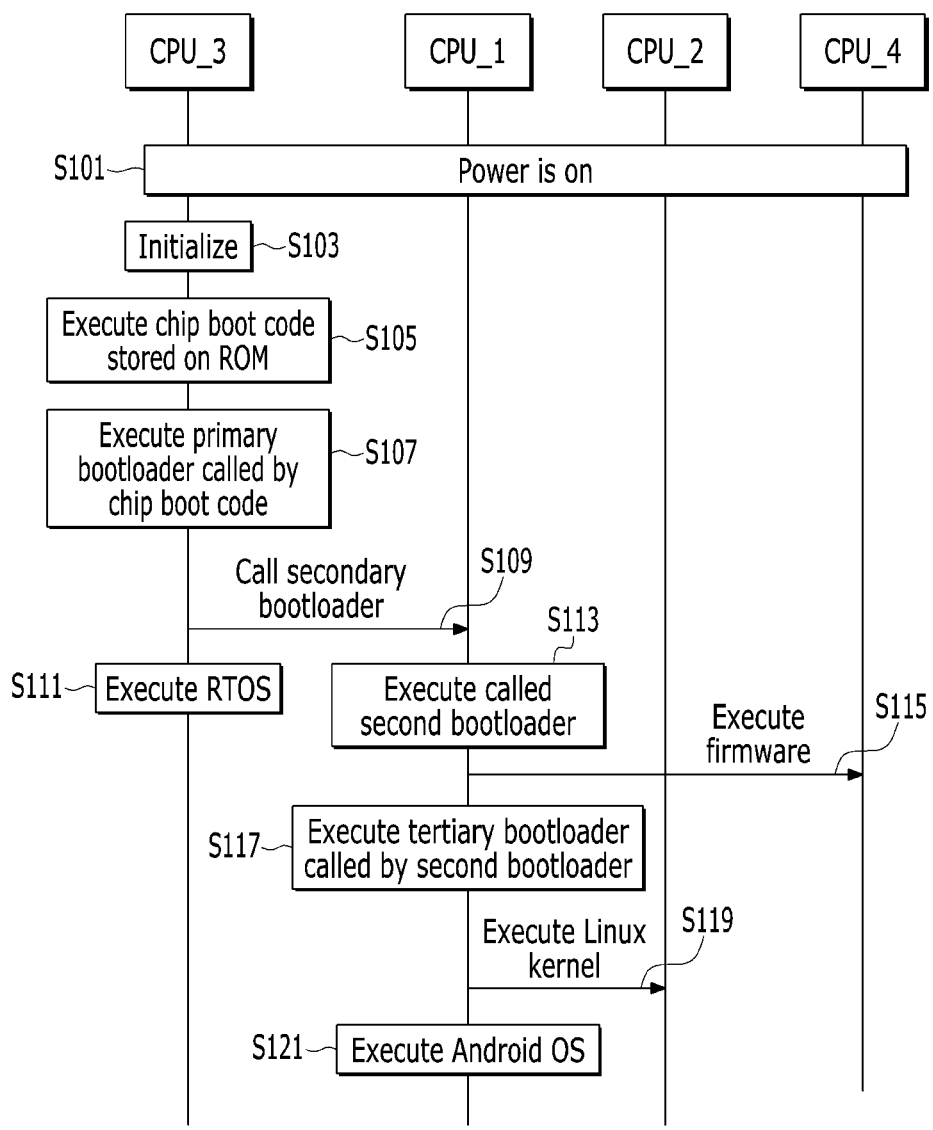
FIG. 4 is a diagram illustrating a booting operation of an SoC according to an embodiment of the present invention.

FIG. 4 is a diagram illustrating a booting operation of an SoC according to an embodiment of the present invention.

Referring to FIG. 4, when heterogeneous CPUs 101, 103, 105, and 107 on an SoC 100 gets powered on, a CPU_3 (105 in FIG. 1 and FIG. 2) operates first.

After initialization (or reset) (S103), the CPU_3 105 performs a basic task for booting, by executing a chip boot code (Chipboot ROM Code) preloaded onto a ROM.

The CPU_3 105 executes a primary bootloader called from a storage device 115, 123, or 125 by the chip boot code (S107). The CPU_3 105 performs a basic task for operating a software program of the CPU_3 105 by executing the primary bootloader, and progresses a preparation for operating the CPU_1 (101 in FIG. 1 and FIG. 2). The preparation includes a call for a secondary bootloader and a task for driving the CPU_1 101.

The CPU_3 (105) transfers the call for the secondary bootloader to CPU_1 (101) (S109).

The CPU_3 105 executes an ROTS being an independent OS (S111).

The CPU_1 101 executes the secondary bootloader called by the CPU_3 105 (S113). Here, the secondary bootloader may be ARM Trusted Firmware.

The secondary bootloader prepares for operating the CPU_4 (107 in FIG. 1 and FIG. 2) and calls a tertiary bootloader. That is, the CPU_1 101 requests to execute a firmware of the CPU_4 107 by executing the secondary bootloader (S115).

The CPU_1 101 executes the tertiary bootloader called by the secondary bootloader (S117).

As described above, the secondary bootloader serves not only as a bootloader but also as a secure firmware so that a plurality of independent software programs can safely share physical resources. For this, the secondary bootloader maintains, on the SDRAM (111 in FIG. 1 and FIG. 2), some codes to be executed as the secure firmware even after booting step.

The secondary bootloader as the secure firmware enables the CPU_1 101 and CPU_2 (103 in FIG. 1 and FIG. 2) to use mutually exclusively a shared physical resource. Specifically, the secondary bootloader is operated in an execution mode with a highest authority in CPU_1 101. The secondary bootloader restricts an access to physical resources by software programs executed in each of the CPU_1 101 and the CPU_2 103, thereby removing a race condition that may occur between the CPU_1 101 and the CPU_2 103.

The CPU_1 (101) gets to be independent of a dependency relationship with the CPU_3 (105) through executing the secondary bootloader. As a result, the CPU_3 105 loses an authority for starting and terminating the CPUs 101, 103, and 107, except for itself.

The tertiary bootloader of the CPU_1 101 drives the CPU_2 103 by calling the Linux kernel of the CPU_2 (103 in FIG. 1 and FIG. 2) (S119). Next, the tertiary bootloader of the CPU_1 101 executes Android OS (S121).

When all booting procedures are completed, the four heterogeneous CPUs 101, 103, 105, and 107 finally get to operate independent software programs performing tasks of different purposes. Therefore, unlike the conventional art using virtualization technology, no one software program occupies the entire CPU. Therefore, even when an abnormality occurs on a software program or a CPU, it is possible to design so as to re-drive only some software program or CPU on which the abnormality occurs without driving the entire system 100, unlike when virtualization technology is used.

In addition, in terms of device sharing, when virtualization technology is used, a central control program controls device access. At this time, since all CPUs should go through the control program, an overhead occurs. Therefore, in case of a real-time task (time critical), virtualization technology cannot be used. However, according to an embodiment of the present invention, since the CPU_3 105 that performs a real-time task such as an RTOS proprietarily uses a dedicated device 123, there is no additional overhead problem.

The embodiment of the present invention described above is not implemented only through the apparatus and method, but may be implemented through a program for realizing a function corresponding to the configuration of the embodiment of the present invention or a recording medium in which the program is recorded.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A system-on-chip (SoC) comprising:
a plurality of central processing units (CPUs) that execute respective software programs independently of each other;
a bus interconnector for connecting the plurality of CPUs; and
at least one access control device that is connected to the bus interconnector and controls each access to a physical resource shared by the plurality of CPUs via the bus interconnector, for each CPU,
wherein the plurality of CPUs comprises at least two CPUs that share physical resources including a memory via a first bus interface and further comprises a resource sharing control device that controls an access to a physical resource exclusively used between the at least two CPUs among the shared physical resources,
wherein the at least two CPUs comprises a first CPU that executes a first software program, and a second CPU that executes a second software program different from the first software program,
wherein the resource sharing control device physically separates a memory region onto which the first software program is loaded among physical resources exclusively used between the at least two CPUs, and blocks an access by the second CPU to the separated memory region,
wherein the plurality of CPUs comprises a third CPU that is connected to a static random access memory (RAM) and a plurality of devices via a second bus interface, and executes a third software program,
wherein the at least one access control device comprises a first access control device that is placed between the second bus interface and the bus interconnector, and controls accesses of other CPUs to the static RAM and the plurality of devices,
wherein the plurality of CPUs comprises a fourth CPU that is connected to a code RAM onto which program codes including a boot code are loaded and a data RAM onto which user data is loaded, via a third bus interface, and executes a fourth software program, and
wherein the at least one access control device further comprises a second access control device that is placed between the third bus interface and the bus interconnector, and controls accesses of other CPUs to the code RAM and the data RAM.

2. The SoC of claim 1, wherein the at least one access control device performs an access control including at least one of a request for sharing a physical resource, a request for accessing a physical resource, and a communication between CPUs including transmission of state information of a CPU.

3. The SoC of claim 1, wherein the resource sharing control device operates a firmware having a higher authority level than the first software program and the second software program, and controls an access to the exclusively used physical resource through the firmware.

4. The SoC of claim 1, wherein the first CPU comprises a quad-core, and
wherein the second CPU, the third CPU, and the fourth CPU comprise a single-core.

5. The SoC of claim 1, wherein the plurality of CPUs execute independently respective software programs after the third CPU, the first CPU, the fourth CPU, and the second CPU are booted sequentially.

6. A method for operating a plurality of central processing units (CPUs) mounted on a single system-on-chip (SoC), the method comprising:
executing a boot code of the SoC in a first CPU; and
executing a primary bootloader called by the boot code in the first CPU,
wherein the first bootloader executes a first software program of the first CPU, and calls a secondary bootloader executed in a second CPU,
wherein the secondary bootloader calls a tertiary bootloader executing a second software program of the second CPU, and executes a third software program of a third CPU, and
wherein the tertiary bootloader executes a fourth software program of a fourth CPU,
wherein the plurality of CPUs comprises at least two CPUs that share physical resources including a memory via a first bus interface and further comprises a resource sharing control device that controls an access to a physical resource exclusively used between the at least two CPUs among the shared physical resources,
wherein the at least two CPUs comprises a first CPU that executes a first software program, and a second CPU that executes a second software program different from the first software program,
wherein the resource sharing control device physically separates a memory region onto which the first software program is loaded among physical resources exclusively used between the at least two CPUs, and blocks an access by the second CPU to the separated memory region,
wherein the plurality of CPUs comprises a third CPU that is connected to a static random access memory (RAM) and a plurality of devices via a second bus interface, and executes a third software program,
wherein the at least one access control device comprises a first access control device that is placed between the second bus interface and the bus interconnector, and controls accesses of other CPUs to the static RAM and the plurality of devices,
wherein the plurality of CPUs comprises the fourth CPU that is connected to a code RAM onto which program codes including a boot code are loaded and a data RAM onto which user data is loaded, via a third bus interface, and executes a fourth software program, and
wherein the at least one access control device further comprises a second access control device that is placed between the third bus interface and the bus interconnector, and controls accesses of other CPUs to the code RAM and the data RAM.

7. The method of claim 6, wherein the first software program comprises an operating system (OS),
wherein the second software program comprises a Linux kernel,
wherein the third software program comprises a real-time operating system (RTOS), and
wherein the fourth software program comprises a firmware.

8. The method of claim 6, wherein the third software program is executed by the second bootloader, when a first access control device that is connected to a bus interconnector connecting the second CPU and the third CPU allows the second CPU to access the third CPU.

9. The method of claim 6, wherein the fourth software program is executed by the third bootloader, when a second access control device that is connected to a bus interconnector connecting the second CPU and the fourth CPU allows the second CPU to access the fourth CPU.

* * * * *